Jan. 16, 1923.
G. A. ANDEREGG.
CURRENT CONTROLLING MEANS FOR ELECTRIC CIRCUITS.
FILED JUNE 30, 1917.
1,442,460
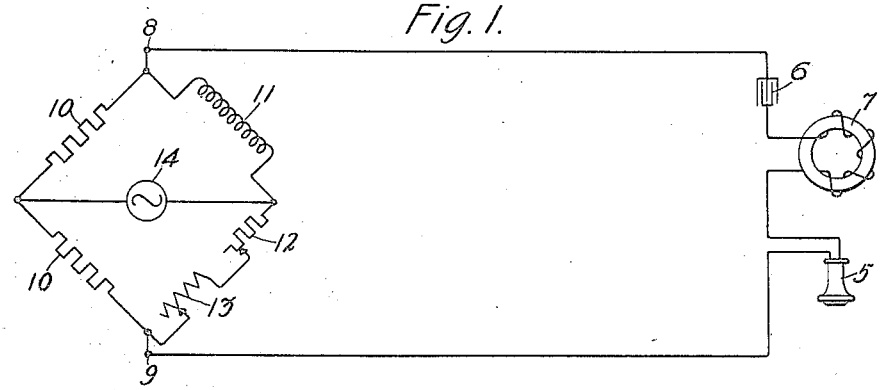
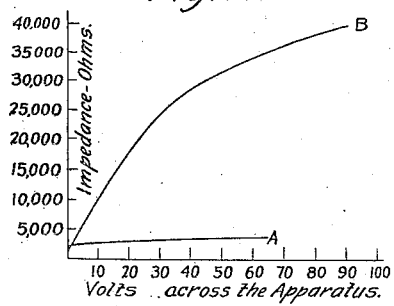
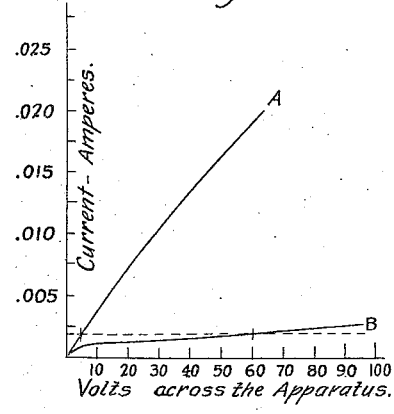
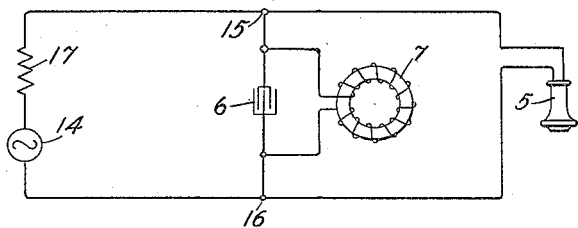
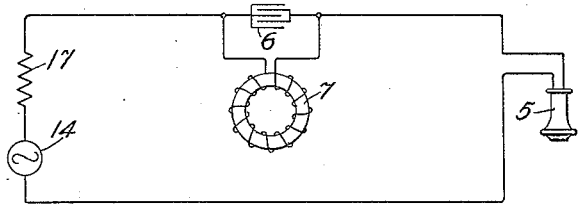
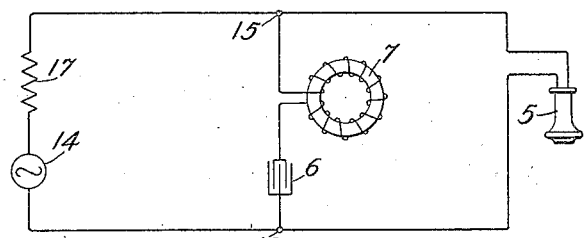
Inventor:
Gustavus A. Anderegg.
by J. G. Roberts
Att'y.

Patented Jan. 16, 1923.

1,442,460

UNITED STATES PATENT OFFICE.

GUSTAVUS A. ANDEREGG, OF OAK PARK, ILLINOIS, ASSIGNOR TO WESTERN ELECTRIC COMPANY, INCORPORATED, OF NEW YORK, N. Y., A CORPORATION OF NEW YORK.

CURRENT-CONTROLLING MEANS FOR ELECTRIC CIRCUITS.

Application filed June 30, 1917. Serial No. 178,000.

*To all whom it may concern:*

Be it known that I, GUSTAVUS A. ANDEREGG, a citizen of the United States, residing at Oak Park, in the county of Cook and State of Illinois, have invented certain new and useful Improvements in Current-Controlling Means for Electric Circuits, of which the following is a full, clear, concise, and exact description.

This invention relates to electric circuits and apparatus for controlling current therein, and more particularly to circuits comprising reactors or reactance coils or such apparatus in combination with condensers.

Heretofore reactors or reactance coils having constant inductances have been used for the purpose of current control. The primary purpose, however, for using such coils was to guard against sudden transient impulses of current or against current of other than the fundamental frequency. Such coils were operative to limit the flow of current of fundamental frequency. only because of the fact that a greater amount of voltage is consumed in the coil when the current increases therein. Such increase in voltage consumption is represented by the well known formula that, $$E = 2\pi f L I \qquad (1)$$

where E is the voltage required to force a current I of frequency $f$ through a reactance coil having an inductance L. From formula (1), it is clear that the voltage consumed in such a coil is directly proportional to the current passing therethrough. While such a degree of protection may be satisfactory for some classes of service, there are many instances where it is not so.

Again for other classes of service, reactors or reactance coils, such as have heretofore been known, cannot be used, due to the impedance thereby introduced into the circuit under normal operating conditions. Where such is the case, it has been proposed to neutralize this impedance by means of a condenser connected in series with the reactor or reactance coil. The protection thus gained is a gain only against currents of other than the fundamental frequency, no protection whatever being obtained against current of the fundamental frequency. This is due to the fact that the leading counter-electromotive force of the condenser is affected by any change of the current equally with the counter-electromotive force of the reactance coil, which is lagging with respect to the current.

An object of this invention is to overcome the hereinbefore mentioned difficulties and in accordance with one feature of this invention, a reactance coil is provided whose inductance changes rapidly with change of current passing through its windings. This result is preferably accomplished by making the core of such material that its permeability increases rapidly with increase of current through the coil windings, in other words, so that a slight increase of current produces a large increase in permeability. Thus, a slight increase of current above the limit predetermined by the design of the apparatus, in response to an increase of voltage across the terminals of the coil, produces so great an increase in inductance due to the coil that the product of the inductance L and the current I, and therefore the voltage consumed in the coil, increases so rapidly that the voltage to which the rest of the apparatus in the circuit is subjected is not unduly increased, notwithstanding a considerable increase may occur in the total voltage impressed on the circuit. In accordance with another feature, the reactance coil is associated with a condenser in such a way as to offer any desired impedance to a current of given frequency and amplitude. Since the capacity of the condenser is practically unaffected by change of current, any change of amplitude of the current will disturb the balance between the reactances of the coil and the condenser, and a corresponding change in the impedance of the circuit, even to the fundamental frequency, will thereby result.

This invention will be more clearly understood by reference to the drawings, wherein Fig. 1 shows the preferred embodiment of the invention, consisting of a condenser, a reactance coil and a telephone receiver functioning as a detecting means in an alternating current Wheatstone bridge circuit; Fig. 2 is a graphical representation of the change of impedance of such detector circuit due to change of voltage impressed thereon; Fig. 3 shows similarly the amount of current produced in the detector circuit by various values of voltage applied across its terminals; while Figs. 4, 5 and 6 show various modifications hereinafter to be described.

In the preferred embodiment of the invention, a telephone receiver 5 may be connected in series with a condenser 6 and a reactance coil 7, across the terminals 8 and 9 of an alternating current Wheatstone bridge circuit. Such bridge circuit may be schematically represented by non-inductive resistance branches 10, 10; a coil 11 to be tested; and a balancing arm comprising a resistance 12 and an impedance 13. Testing current may be supplied by an alternating current generator 14. In ordinary operation, the resistance arms 10, 10; the resistance 12 and the impedance 13, are permanently connected to the generator 14. The testing coil 11 is, of course, necessarily removable in order to provide for the insertion of different coils to be tested. When the bridge is perfectly balanced, there is, as is well known, no difference of potential between the terminals 8 and 9, and consequently no tendency for current to flow through the detector circuit. When the coil 11 is removed, however, there is a relatively large difference of potential between the terminals 8 and 9 of the detector circuit, and consequently a tendency for a large amount of current to flow through the receiver 5. Such large difference of potential between the terminals 8 and 9 may also result from short-circuiting the coil 11. Were the detector circuit not provided with a condenser 6 and a reactance coil 7 whose inductance changes rapidly with change of current in the coil, this current would be of such magnitude as to cause an excessive amplitude of vibration of the receiver diaphragm, which would be injurious to an observer if he happened to have the receiver held closely to his ear. In fact, it has been found that the disturbance, due to the accidental removal or short-circuiting of the test apparatus 11, may be so great as to incapacitate the observer for a considerable period of time.

The effect of including the condenser 6 and the reactance coil 7 in the detector circuit is clearly shown by Figs. 2 and 3, which are true representations of the results of measurements made on an actual testing circuit, as shown in Fig. 1. In Fig. 2, curve A represents the impedance of the circuit through the receiver 5 for various values of voltage between the terminals 8 and 9 when the condenser 6 and the reactance coil 7 are omitted; while curve B represents the impedance of the same circuit, when the condenser 6 and the reactance coil 7 are included in it. Curves A and B of Fig. 3 show the corresponding values of current flowing through the receiver 5. It is to be noted from Fig. 2 that at small values of voltage across the terminals 8 and 9, the impedance of the detector circuit is even less than that of the telephone receiver alone. This is actually what is desired, since the highest sensitivity of the detector circuit is required when the bridge circuit is most nearly balanced.

It has been found in the actual testing circuit hereinbefore mentioned that currents up to approximately 0.0018 ampere do not cause an injuriously loud tone in the receiver. By referring to Fig. 3, it is seen that approximately five volts across the apparatus, that is, between the terminals 8 and 9 would cause this amount of current, were the projective apparatus not in use (see curve A); while about sixty volts would be required to produce the same amount of current when such apparatus is being used (see curve B). Thus the observer is amply protected against any voltage which it is desirable and necessary to use in actual operation. The constants of the reactance coil 7 and of the condenser 6, could moreover easily be changed in order to increase the range of voltage over which satisfactory protection could be obtained.

A reactance coil having the following characteristics has been found to function satisfactorily in the detector circuit of Fig. 1. The core is composed of silicon steel plates, having a permeability of approximately 225 for every small magnetizing forces at a frequency of 900 cycles per second. The winding consists of 2000 turns of insulated copper wire wound uniformly upon the core having a mean length of approximately twenty centimeters and a cross sectional area of approximately three square centimeters. For an alternating current of 0.00001 ampere, such a coil has an inductance of approximately 1.7 henrys, while for a current of 0.0015 ampere its inductance is approximately 5.8 henrys. A condenser having a capacity of approximately 0.016 microfarad has been found suitable for use with such coil.

The modification of Fig. 4 may also be used to limit the amount of current in a receiver or other energy transforming device 5. By suitably choosing the constants of the condenser 6 and reactance coil 7, the impedance of the parallel circuit, of which they form the branches, may be made exceedingly high for very small values of current flowing through the receiver 5, and so may provide a high impedance shunt thereabout. Any increase of voltage across the terminals 15 and 16 will cause this impedance to decrease rapidly, due to the change of inductance of the reactance coil 7, thereby placing a comparatively low impedance shunt about the receiver 5. This increased current flowing from the generator 14 through an impedance coil or other apparatus 17, will limit the voltage attainable between the terminals 15 and 16 and hence the current through the receiver 5.

In the modification of Fig. 5 a condenser 6 and reactance coil 7 are connected in parallel with each other, and in turn in series with a receiver or other energy transforming apparatus 5. This combination may be supplied with power from a generator 14 through an impedance coil or other apparatus 17. A suitable condenser arranged in this way with a suitable coil whose inductance changes greatly with change of current in its winding may be used to provide a circuit having very high impedance for some predetermined chosen condition of voltage or current and a lower impedance for all other conditions of voltage or current.

The modification of Fig. 6 consists of a condenser 6 and a reactance coil 7 connected in series with each other and in turn in parallel with a receiver or other energy transforming apparatus 5. This combination likewise may be supplied with power from a generator 14 through an impedance coil or other apparatus 17. This arrangement using a suitable condenser in connection with a suitable coil whose inductance changes greatly with change of current may be used to produce a low impedance shunt around any desired apparatus for some predetermined condition of current or voltage. The shunting effect of the condenser and reactance coil in series will then be less for any other conditions of voltage or current.

Other conditions than those hereinbefore mentioned may obviously be met by suitably choosing the constants of the condenser and reactance coil, and all such combinations wherein a reactance coil, whose inductance changes rapidly with change of current in its windings, is used, either alone or in combination with a condenser, clearly come within the scope of this invention.

What is claimed is:

1. An electrical circuit comprising a source of current, a detector responsive to normal values of the current from said source, and means for protecting said detector from substantial changes in the normal value of the current supplied by said source, said means comprising a closed magnetic circuit reactance coil in circuit with said source and said detector, the magnetic circuit of said coil being composed of material, the permeability of which changes very rapidly with changes in the strength of the current flowing through the coil.

2. An electrical circuit comprising a source of alternating current, a detector responsive to current from said source and designed to operate within a given range of current strength, and means for protecting said detector from frequencies substantially different from the normal frequency of said source and for protecting said detector from substantial changes in the root mean square value of the current supplied by said source, said means comprising a closed magnetic circuit reactance coil in circuit with said source and said detector.

3. In an electrical circuit comprising a source of alternating current, a detector responsive to current from said source and designed to operate within a given range of current strength, and means for holding substantially constant the root mean square value of the current supplied to said detector regardless of wide variations in the voltage supplied by said source, said means comprising a condenser and a closed magnetic circuit reactance coil in circuit with said detector, said condenser and coil having such values as to resonate at a frequency present in said circuit.

4. An electrical circuit comprising a source of alternating current, a detector responsive to current from said source and designed to operate within a given range of current strength, and means for protecting said detector from substantial changes in the root mean square value of the current supplied to said source, said means comprising a condenser and a closed magnetic circuit reactance coil in circuit with said detector, said condenser and coil resonating at the normal frequency of said source.

5. An electrical circuit comprising a source of alternating current, a detector in circuit with said source and designed to operate within a given range of current strength, and means for holding substantially constant the drop in potential across the terminals of said detector regardless of wide variations in the voltage supplied by said source, said means comprising a condenser and a closed magnetic circuit reactance coil in series with each other and in series with said detector, said condenser and coil having such values as to resonate at the frequency of said source for a strength of current supplied by said detector which is within the permissible range.

6. A testing circuit for testing the characteristics of electrical apparatus comprising a Wheatstone bridge circuit including the apparatus to be tested, a source of alternating current associated with the bridge, a detector responsive to small fluctuating currents to determine when the bridge is in balanced condition, said detector being designed to operate within a given range of current strength, and means for preventing a substantial unbalance of said bridge from causing current to flow through said receiver of a greater strength than is permissible, said means comprising a closed magnetic circuit reactance coil, the core of which is composed of a material, the permeability of which changes very rapidly with changes in the strength of the current flowing through the coil.

In witness whereof, I hereunto subscribe my name this 26th day of June, A. D., 1917.

GUSTAVUS A. ANDEREGG.